Patented Feb. 21, 1939

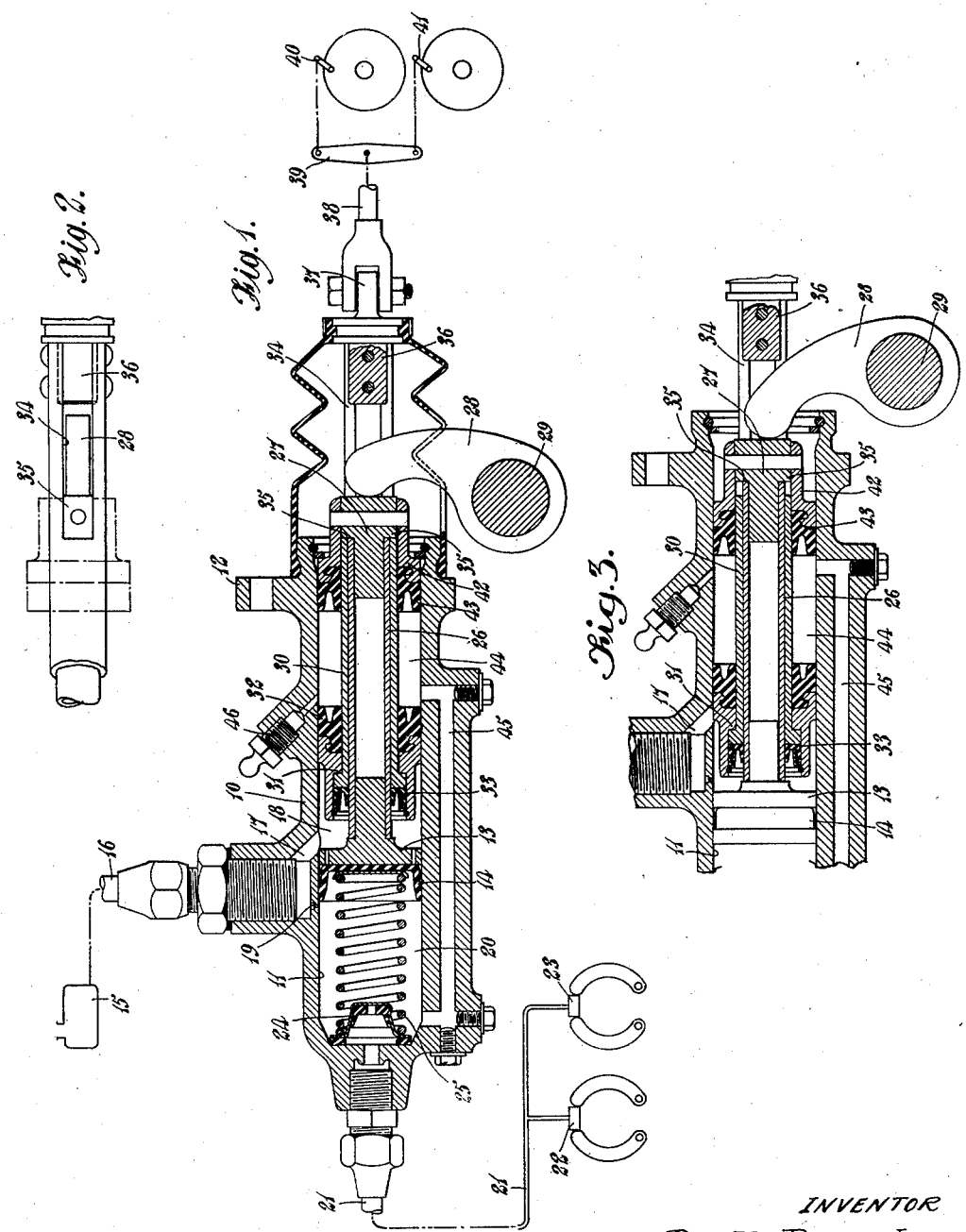

2,148,256

UNITED STATES PATENT OFFICE 2,148,256

BRAKING SYSTEM FOR VEHICLES

Denis Tabor Brock, London, England, assignor to Automotive Products Company Limited, London, England Application July 17, 1937, Serial No. 154,277
In Great Britain July 17, 1936

12 Claims. (Cl. 188—152)

This invention relates to braking systems for vehicles, and it has for its object to provide an improved form of braking system which combines the advantages of the liquid pressure and the mechanical form of actuation, the improved system being arranged so that the braking torques on the various wheels are normally hydraulically balanced, i. e. are maintained at a predetermined and constant ratio, while at the same time the system remains efficiently operative in the event of failure of the liquid pressure part of the system.

The invention accordingly provides in a vehicle braking system having a common actuating member connected by a mechanical rigging with one brake or set of brakes and by a liquid pressure transmission device with another brake or set of brakes, an auxiliary liquid space of variable volume which is fed from the liquid pressure transmission device and is arranged so that it normally transmits the brake-applying effort hydraulically from the actuating member to the mechanical rigging, but in the event of liquid leakage, said auxiliary liquid space contracts and thereafter the actuating force is transmitted to said brake rigging wholly mechanically.

Also as a further feature the invention provides a master cylinder unit for operating two separate brake systems, one of which is actuated hydraulically by the pressure of liquid in a pipe line and the other by a mechanical brake rigging, said unit being provided with an auxiliary liquid chamber of variable volume, which chamber is normally interposed between the actuating means and the mechanical system, and is fed with liquid from the hydraulic system whereby the ratio of the brake-applying forces in the two systems is maintained constant. The auxiliary liquid chamber is preferably provided with a positive stop which restricts its contraction and transmits the brake-applying force from the actuating means to the mechanical rigging in the event of the liquid pressure falling.

Also a master cylinder unit is provided for operating two separate brake systems and comprising a cylinder connected with a liquid reservoir, a master piston which is slidable in the cylinder to provide a main working space for actuating one of the hydraulic systems through a pipe line and which has external actuating means, an intermediate member carrying a piston also slidable within the cylinder and having an external connection for attachment to the rigging of a mechanically applied brake, and an auxiliary piston movable as one with the main piston, an auxiliary working space between the auxiliary piston and the piston on the intermediate member being connected with the main working space whereby during normal operation of the brakes the liquid within the auxiliary working space serves to transmit force from the actuating means to the mechanical brake rigging, thus maintaining constant the ratio of the brake-applying forces transmitted to the two brake systems. Conveniently the main and auxiliary working spaces are both contained within a common cylinder having a bore of uniform diameter. Further, the main piston may be formed with a stem to which the auxiliary piston is fixed and which is surrounded by the intermediate member, the latter being tubular in form and being slotted longitudinally for the accommodation of a radial projection extending from the stem of the main piston so as to support the auxiliary piston. For actuating the master cylinder unit an arm can conveniently engage within the slot in the intermediate member and coact with the stem of the main piston. Thus, in the event of the liquid pressure in the auxiliary chamber falling below a predetermined value the radial projection automatically engages the end of the slot in the intermediate member, thus placing the actuating means in direct connection with the rigging of the mechanically applied brake or brakes. The space between the main piston and the piston upon the intermediate member may be in permanent connection with the reservoir, while the cylinder may be conveniently formed with a longitudinal passage connecting the main working space with the auxiliary working space.

One embodiment of the invention is illustrated by way of example in the accompanying drawing in which Figure 1 is a sectional elevation of the improved master cylinder unit, the brakes and other component parts of the system being shown diagrammatically to a reduced scale;

Figure 2 is a fragmentary plan partly in section and showing the arrangement of the slotted intermediate member and the actuating means; and Figure 3 is a view corresponding in part to Figure 1, but showing one position of the parts when the brakes are applied.

The master unit of the system comprises a cylinder 10 which is formed with a longitudinal bore 11 of uniform diameter and has a flange 12 for fixing purposes. A main piston 13 having a packing cup 14 is slidably mounted in the cylinder, and when it is inoperative it occupies the position shown in Figure 1. A reservoir 15 connected by a pipe line 16 feeds liquid through a passage 17 into a space 18 behind the piston, while a relatively small breathing aperture 19 just in front of the lip of the packing cup 14 serves to compensate for temperature changes, and to allow the escape of air in the manner which is now quite well known. The main working space 20 is connected by a pipe line 21 with the wheel cylinders 22 and 23 of the hydraulically actuated brakes, a valve device 24 of the usual construction being interposed so as to maintain a normal slight pressure in the system, while a coiled compression spring 25 serves to hold the packing cup 14 in position, to provide the pressure for the valve device 24, and to move the main piston 13 to its inoperative position.

The main piston 13 is supported and actuated through a tubular stem 26 having at its outer end a substantially T-shaped plug 27, against the end of which bears an actuating arm 28 carried by a pivotal spindle 29.

An intermediate member 30 which is tubular in form and is slidably mounted upon the stem 26 is fitted at its front end with a piston 31 having a packing cup 32, a subsidiary packing cup 33 being also provided as shown so as to prevent leakage of liquid from the reservoir between the intermediate member 30 and the stem 26. At its outer end the intermediate member 30 is formed at its top and bottom with a pair of longitudinal slots 34 which are engaged by the radially projecting portions 35 of the T-shaped plug 27 and which also accommodate the tip of the actuating arm 28. This is shown clearly in Figure 2, and it will be seen that when the master cylinder unit is inoperative the portions 35 engage the inner ends of the two slots 34. The outer end of the slots in the intermediate member 30 is closed by a plug 36 which is formed with a lug 37 serving as an external connection for attachment to any convenient system of rods and levers or the like comprising a mechanical rigging for applying certain of the brakes of the vehicle. In the installation which is shown in Figure 1 a tension rod 38 is connected to the centre of an equalizing bar 39, and this in turn is coupled to the actuating levers 40 and 41 of a pair of mechanically-operated brakes. The radially projecting portions 35 serve also to carry an auxiliary piston 42 which has a packing cup 43, and is thus movable as one with the main piston 13. An auxiliary working space 44 of annular shape is thus formed between the pistons 31 and 42, and this space is in permanent connection with the main working space 20 on account of a passageway 45 which is formed longitudinally as shown in the wall of the cylinder 10. The auxiliary working space 44 is further provided with a screw-threaded connection 46 which is used for bleeding and the removal of air bubbles in the usual manner during the process of filling the system with fluid.

During the normal operation of the system movement of the arm 28 in an anti-clockwise direction causes the main and auxiliary pistons 13 and 42 to be moved forward, and when the packing cup 14 closes the breathing aperture 19 pressure is created in the main working space 20, this pressure, of course, being communicated simultaneously to the auxiliary working space 44. This initial part of the movement also carries forward the intermediate member 30 and begins to apply the brakes which are mechanically connected with the tension member 38. As the liquid pressure builds up in the working spaces 20 and 44 the wheel cylinders 22 and 23 are also actuated and apply the corresponding brakes. It will be noted, however, that the cross-sectional area of the auxiliary working space 44 is considerably less than that of the main working space 20 due to the presence of the intermediate member 30, so that there comes a time during the normal application of the brakes at which the force applied to the piston 31 on account of the liquid pressure in the working space 44 exceeds the pull which is being mechanically applied to the intermediate member 30 by the engagement of the plug member 27 with the ends of the slots 34. Any movement of the arm 28 beyond this point causes liquid under pressure to be transferred from the working space 20 to the auxiliary working space 44, thus moving the piston 31 in advance of the auxiliary piston 42 and bringing about a hydraulic equalization or regulation as between the brakes applied by the wheel cylinders 22 and 23 on the one hand and the brakes applied mechanically through the tension member 38 on the other hand. It will be appreciated that the braking forces need not be actually equal, as such a state depends purely upon the relative areas of the piston 31 and those of the wheel cylinders 22 and 23. Whenever the brakes which are mechanically connected with the tension member 38 are applied through the medium of the liquid pressure in the auxiliary working space 44 the force exerted upon said tension member 38 must necessarily bear a constant and predetermined ratio to the pressure which is present in the working space 20, and is thus fed to the wheel cylinders 22 and 23. This action will be seen more clearly from Figure 3, in which the movement of the arm 28 in an anti-clockwise direction has not only caused the main piston 13 to move to the left but the increase in the pressure of the liquid has brought about an enlargement of the working space 44, which latter thus forms an operative link by which the force derived from the arm 28 is transmitted to the tension member 38 of the mechanical brake rigging.

In the event of a breakage or a severe leakage occurring in the liquid pressure part of the apparatus it is still possible to apply the mechanically-actuated brakes connected with the tension member 38 as the arm 28 merely presses upon the T-shaped plug 27, and this in turn moves by direct mechanical engagement the intermediate member 30.

It will be understood that the invention is not limited to this particular form of construction, but includes other arrangements giving the same effect. For example the back brake operating unit may be separate from the master cylinder and other modifications may be made in the construction of the device.

It will be seen that the invention provides for the braking on all the wheels of a vehicle to be equalized, or balanced at predetermined ratios, under normal conditions, whilst also providing for the mechanical application of some at least of the brakes in the event of failure of the liquid pressure, such mechanical application being effected simply by actuation of the normal brake pedal or other operating means.

What I claim is:

1. In a vehicle braking system a set of mechanically actuated brakes, a set of hydraulically actuated brakes, a common actuating member therefor, mechanical rigging connecting the actuating member with the mechanically actuated brakes, a liquid pressure transmission device connecting the actuating member and the hydraulically actuated brakes, a pair of piston means separated by an auxiliary liquid space of variable volume connected with the liquid pressure transmission device, one of the piston means being connected to the common actuating member and the other to the mechanical rigging, and means whereby in case of leakage actuating force is transmitted to the said mechanical brake rigging wholly mechanically.

2. A master cylinder unit for operating two separate brake systems, one of which is actuated hydraulically by the pressure of liquid in a pipe line and the other by a mechanical brake rigging comprising a main hydraulic cylinder and a main piston, a pair of auxiliary piston means separated by an auxiliary liquid chamber of variable volume, one of the piston means being connected to the actuating means and the other piston being connected to the mechanical system, and means for connecting the auxiliary liquid chamber with the main cylinder, whereby the ratio of the brake-applying forces in the two systems is maintained constant.

3. A master cylinder unit as claimed in claim 2, wherein the auxiliary liquid chamber is provided with a positive stop which restricts its contraction and transmits the brake-applying force from the actuating means to the mechanical rigging in the event of the liquid pressure failing.

4. A master cylinder unit for operating two separate brake systems and comprising a cylinder connected with a liquid reservoir, a master piston which is slidable in the cylinder to provide a main working space for actuating one of the systems hydraulically through a pipe line and which has external actuating means, an intermediate member carrying a piston also slidable within the cylinder and having an external connection for attachment to the rigging of a mechanically applied brake, and an auxiliary piston movable as one with the main piston, an auxiliary working space between the auxiliary piston and the piston on the intermediate member being connected with the main working space whereby during normal operation of the brakes the liquid within the auxiliary working space serves to transmit force from the external actuating means to the piston on the intermediate member and then to the mechanical brake rigging thus maintaining constant the ratio of the brake-applying forces transmitted to the two brake sysems.

5. A master cylinder unit as claimed in claim 2, wherein the main and auxiliary working spaces are both contained within a common cylinder having a bore of uniform diameter.

6. A master cylinder unit as claimed in claim 4, wherein the main piston is formed with a stem to which the auxiliary piston is fixed.

7. A master cylinder unit as claimed in claim 4, wherein the intermediate member is tubular and surrounds a stem supporting the main and auxiliary pistons.

8. A master cylinder unit as claimed in claim 4, wherein the intermediate member is tubular and surrounds a stem supporting the main and auxiliary pistons, the intermediate member being slotted longitudinally, and this slot accommodating a radial projection extending from the stem of the main piston to support the auxiliary piston.

9. A master cylinder unit as claimed in claim 4, wherein the actuating means comprises an arm which engages within a slot in the intermediate member and coacts with the stem of the main piston.

10. A master cylinder unit as claimed in claim 4, wherein a radial projection upon the stem of the main piston engages the end of a slot in the intermediate member when the liquid pressure in the auxiliary chamber falls below a predetermined value thus placing the actuating means in direct connection with the rigging of the mechanically-applied brake.

11. A master cylinder unit as claimed in claim 4, wherein the space between the main piston and the piston upon the intermediate member is in permanent connection with the reservoir.

12. A master cylinder unit as claimed in claim 4, wherein the cylinder is formed with a longitudinal passage connecting the main working space with the auxiliary chamber.

DENIS TABOR BROCK.